(12) United States Patent
Ku et al.

(10) Patent No.: US 8,498,069 B2
(45) Date of Patent: Jul. 30, 2013

(54) VOICE COIL MOTOR

(75) Inventors: Ping-Han Ku, Taipei Hsien (TW);
Chi-Wei Chiu, Taipei Hsien (TW)

(73) Assignee: Hon Hai Precision Industry Co., Ltd.,
New Taipei (TW)

( * ) Notice: Subject to any disclaimer, the term of this patent is extended or adjusted under 35 U.S.C. 154(b) by 498 days.

(21) Appl. No.: 12/783,566

(22) Filed: May 20, 2010

(65) Prior Publication Data

US 2011/0249352 A1    Oct. 13, 2011

(30) Foreign Application Priority Data

Apr. 9, 2010   (TW) .............................. 99110974 A

(51) Int. Cl.
   *G02B 7/02*       (2006.01)
(52) U.S. Cl.
   USPC .......................................... 359/824; 359/811

(58) Field of Classification Search
   USPC .................. 359/811, 815, 819–824
   See application file for complete search history.

(56) References Cited

U.S. PATENT DOCUMENTS

| | | | |
|---|---|---|---|
| 8,059,190 B2 * | 11/2011 | Chang et al. | 348/371 |
| 8,284,505 B2 * | 10/2012 | Wang | 359/815 |
| 8,295,698 B2 * | 10/2012 | Beshai | 398/47 |

* cited by examiner

*Primary Examiner* — Thomas K Pham
*Assistant Examiner* — Brandi Thomas
(74) *Attorney, Agent, or Firm* — Altis Law Group, Inc.

(57) ABSTRACT

A spring plate includes a plate body having a through hole defined at the center thereof, and a terminal perpendicularly extending from the plate body. The plate body includes an outer closed-loop frame, an inner closed-loop frame, and spring parts interconnected between the outer closed-loop frame and the inner closed-loop frame. The terminal has an end portion distal from the plate body with at least one of a through hole and a recess therein.

11 Claims, 3 Drawing Sheets

VOICE COIL MOTOR

BACKGROUND

1. Technical Field

The present disclosure relates to lens actuators, and particularly, to a voice coil motor type lens actuator, a spring plate in the lens actuator, and a camera module with the spring plate.

2. Description of Related Art

Variable focal length lenses are widely used in optical systems. Optical systems incorporating such lenses can, for example, provide focused images of objects at varying distances without adjusting the distance between the lens and the image plane. Variable focal length lenses can also be used in optical systems that provide varying magnification without change of lenses.

Generally, the optical system usually includes an actuator, such as a step motor, to drive the lenses. However, the step motor is relatively large in volume. Use of the step motor requires a significant amount of space for movement of the lenses, which makes the optical system bulky.

Therefore, it is desirable to provide a lens actuator adapted for driving the lenses with more compact structure and less mechanical movement, a spring plate in the lens actuator, and a camera module with the spring plate.

DETAILED DESCRIPTION

Figure 1:
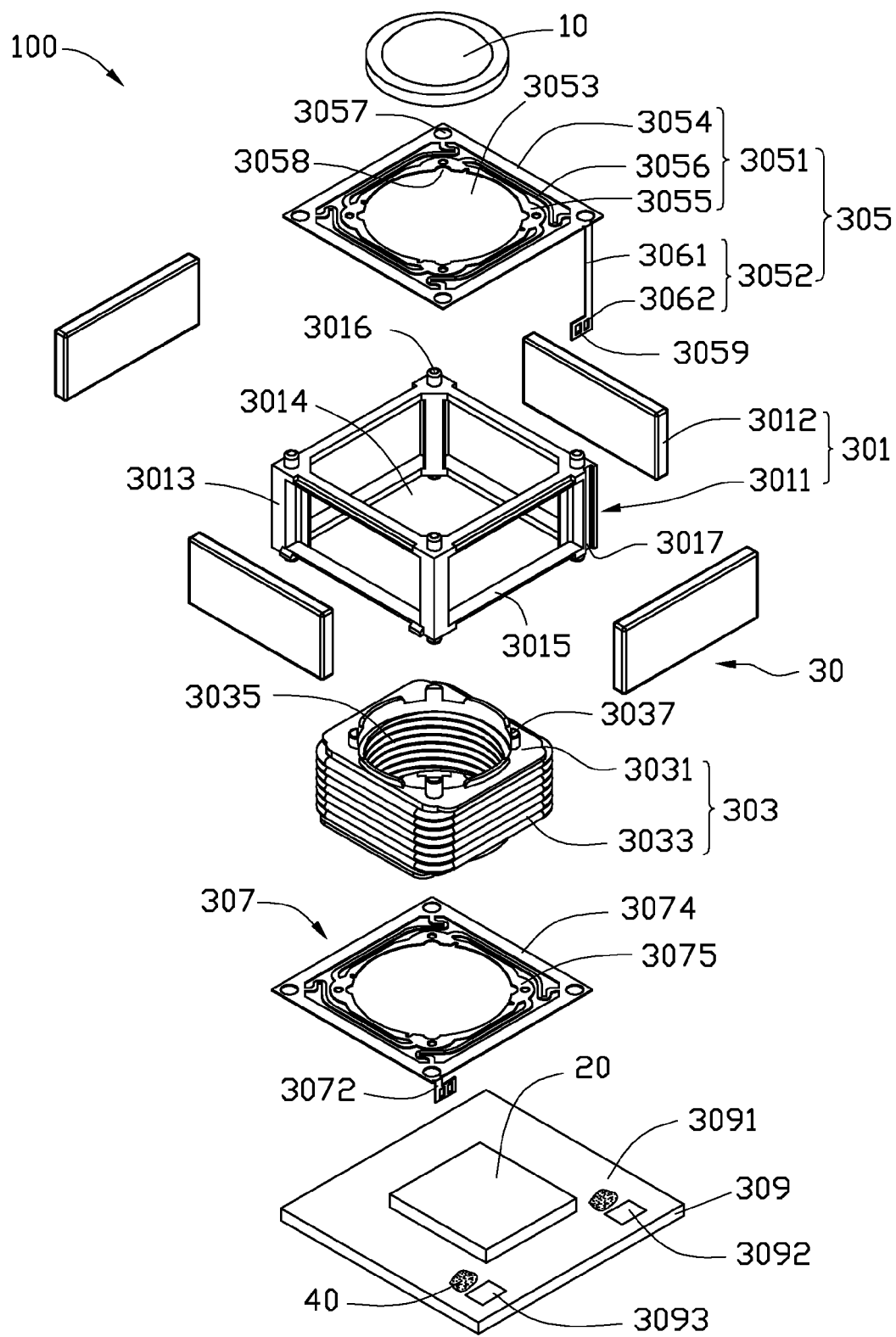
FIG. 1 is an isometric view of a camera module according to a first embodiment.

Referring to FIG. 1, a camera module 100 according to a first embodiment is shown. The camera module 100 includes a lens barrel (not shown), a lens 10 received in the lens barrel, an image sensor 20 for receiving light from the lens 10 and forming an image, and a voice coil motor 30. In other embodiments, there may be two, there or more lenses in the lens barrel.

The voice coil motor 30 includes a fixed unit 301, a movable unit 303, two spring plates 305, 307 respectively located on the two ends of the movable unit 303, and a supporting base 309.

The fixed unit 301 includes a cubic bracket 3011, and a plurality of magnets 3012. The cubic bracket 3011 includes a frame body 3013. A first accommodation chamber 3014 is defined in the frame body 3013. Four magnet mounting holes 3015 are respectively defined in four sides of the frame body 3013. The magnet mounting holes 3015 are in communication with the first accommodation chamber 3014, and are configured for receiving the magnets 3012. Four first locating pins 3016 respectively vertically protrude from the top and bottom sides of the frame body 3013 at each corner thereof. The first locating pins 3016 are configured for locating and fastening the fixed unit 30 to one of the spring plates 305, 307 by receiving an amount of adhesive. A terminal groove 3017 is formed on one side of the frame body 3013. The number of the magnets 3012 corresponds to that of the magnet mounting holes 3015. The magnets 3012 are respectively mounted in the magnet mounting holes 3015.

The movable unit 303 is accommodated in the first accommodation chamber 3014, and includes a movable barrel 3031 and coils 3035 wrapped around on the outer wall of the movable barrel 3031. A second accommodation chamber 3035 is defined in the movable barrel 3031. The second accommodation chamber 3035 is a through hole for receiving the lens barrel with the lens 10. Four second locating pins 3037 respectively vertically protrude from the top and bottom sides of the movable barrel 3031 at each corner thereof. The second locating pins 3037 can be coated with adhesive for locating and fastening the movable barrel 3031 to one of the spring plates 305, 307.

Figure 2:
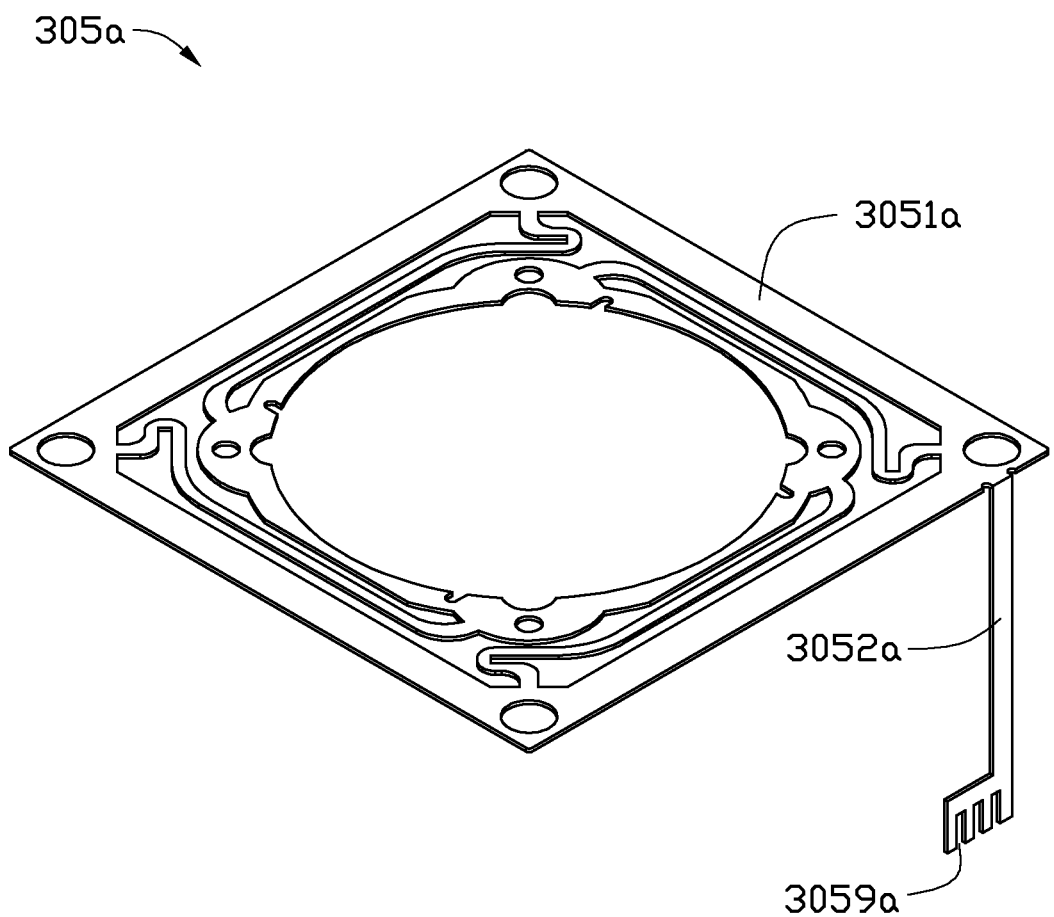
FIG. 2 is an isometric view of a spring plate according to a second embodiment.

Referring to FIG. 2, the spring plate 305 includes a plate body 3051, and a connection terminal 3052 perpendicularly extending from the plate body 3051. In the present embodiment, the plate body 3051 is square shaped. A through hole 3053 is defined in the center of the plate body 3051 for allowing light to pass through the plate body 3051. The plate body 3051 includes an outer closed-loop frame 3054, an inner closed-loop frame 3055 concentric with and surrounded by the outer closed-loop frame 3054, and a plurality of spring parts 3056 interconnected between the outer closed-loop frame 3054 and the inner closed-loop frame 3055. In the present embodiment, there are four spring parts 3056. In other embodiments, there may be two, there or more spring parts 3056.

The outer closed-loop frame 3054 includes a plurality of locating holes 3057 corresponding to the respective first locating pins 3016 defined therein. Adhesive may be filled in the locating holes 3057 which then receive the first locating pins 3016 to locate and fasten the spring plate 305 to the bracket 3011.

The inner closed-loop frame 3055 includes a plurality of cutouts 3058 defined therein. The cutouts 3058 communicate with the through hole 3053, and correspond to the respective second locating pins 3037. Adhesive may be filled in the cutouts 3058 which then receive the second locating pins 3057 to locate and fasten the spring plate 305 to the movable barrel 3031. In other embodiments, the cutouts 3058 may instead be through holes not in communication with the through hole 3053.

The terminal 3052 is mounted in the terminal groove 3011 of the bracket 32. One end portion near to the plate body 3051 of the terminal 3052 is electrically connected to the coils 3033 via the plate body 3051. The other end portion distal from the plate body 3051 of the terminal 3052 is electrically connected to the supporting base 309 by an electrically conductive adhesive 40. A plurality of passable structures 3059 are evenly defined in the end portion distal from the plate body 3051 of the terminal 3052. The passable structures 3059 are configured for allowing the electrically conductive adhesive 40 to pass into the terminal 3052, thereby increasing the contact area between the terminal 3052 and the electrically conductive adhesive 40 on the supporting base 309. Accordingly, the contact resistance between the terminal 3052 and the electrically conductive adhesive 40 is decreased, and the electrical connection between the terminal 3052 and supporting base 309 is more reliable. Thus, the driving efficiency of the voice coil motor 30 is improved. Accordingly, the efficiency of the camera module 100 can be improved.

In the present embodiment, the terminal 3052 is L-shaped, and includes a first connection portion 3061 connected to the plate body 3051 and a second connection portion 3062 perpendicularly extending from the first connection portion 3061. The second connection portion 3062 is distal from the plate body 3051, and defines the passable structures 3059 therein. In the present embodiment, the passable structures 3059 are through holes. In alternative embodiments, the second connection portion 3062 may be omitted. In such case, the passable structures 3059 should be defined in the end portion distal from the plate body 3051 of the first connection portion 3061. In other alternative embodiments, there may be one, three, four or more passable structures in the second connection portion 3062.

Most of the structure of the spring plate 307 is similar to that of the spring plate 305, except that, the spring plate 307 includes a terminal 3072 perpendicularly extending from one side thereof, and shorter than the terminal 3052. In other embodiments, the speed of returning the movable barrel 3031 with the lens 10 to its original position does not needed to be faster, the spring plate 307 or the spring plate 305 may be omitted resulting in less restoring force applied to the movable barrel 3031 with the lens 10.

The supporting base 309 is mounted on the bottom portion of the bracket 3011, and includes a supporting surface 3091 facing the bracket 3011, and two electrically conductive pads 3092, 3093 formed on the supporting surface 3091. The supporting surface 3091 is configured for supporting the bracket 3011 and the image sensor 20. The two electrically conductive pads 3092, 3093 are respectively connected to the terminals 3052, 3072 by the electrically conductive adhesive 40.

When an electric current is applied to the two terminals 3052, 3072 and the coils 3033, the coils 3033 are excited and act upon the magnets 3013, thereby receiving a magnetic force to drive the movable barrel 3031 with the lens 10 to linearly move along its central axis.

When electric current is cut off from the two terminals 3052, 3072, the spring plate 305 and the spring plate 307 impart a restoring force to the movable barrel 3031 with the lens 10, thereby returning the movable barrel 3031 with the lens 10 to its original position.

The lens barrel with the lens 10 is received in the second accommodation chamber 3035 of the movable unit 303. The movable unit 301 with the lens barrel and the lens 10 is received in the first accommodation chamber 3014 of the fixed unit 301. Thus, the voice coil motor 30 with the fixed unit 301 and the movable unit 303 is more compact. In addition, the movable unit 303 can be linearly moved by the magnetic force. Accordingly, the voice coil motor 30 has less mechanical movement.

Referring to FIG. 2, a spring plate 305a, in accordance with a second embodiment, is shown. The spring plate 305a includes a plate body 3051a, and a terminal 3052b. A plurality of passable structures 3059b are defined in the end portion distal from the plate body 3051a of the terminal 3052b, and are recesses. The passable structures 3059 are exposed at a common edge of the terminal 3052b. In the present embodiment, the passable structures 3059b are exposed at a straight edge of the terminal 3052b, and cooperatively define a square wave pattern. In alternative embodiments, the passable structures 3059b may cooperatively define a saw tooth wave pattern.

Figure 3:
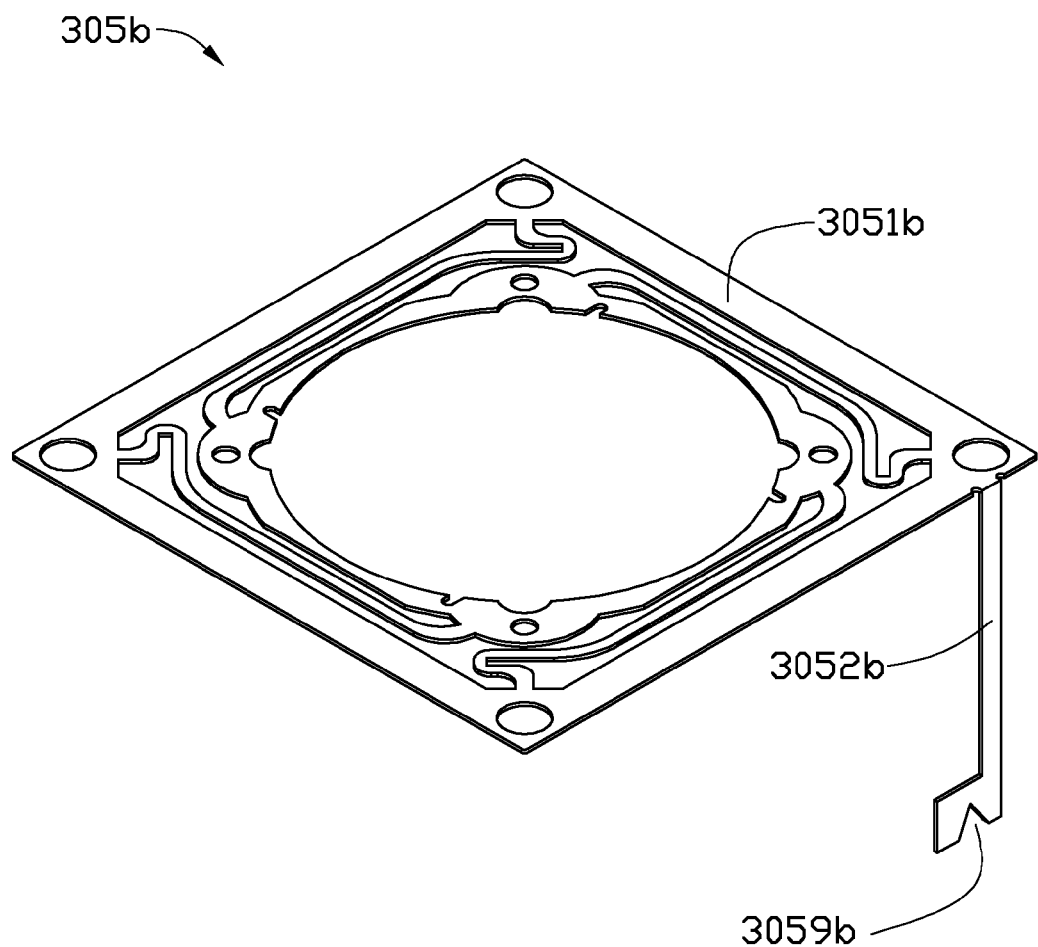
FIG. 3 is an isometric view of a spring plate according to a third embodiment.

Referring to FIG. 3, a spring plate 305b, in accordance with a third embodiment, is shown. The spring plate 305b includes a plate body 3051b and a terminal 3052b. A passable structure 3059b is defined in the end portion distal from the plate body 3051b of the terminal 3052b. In the present embodiment, the passable structure 3059b is a V-shaped recess. In other embodiments, the passable structure 3059 may be a U-shaped recess, a trapezoidal recess, etc.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope and spirit of the appended claims.

What is claimed is:

1. A voice coil motor comprising:
a fixed unit, the fixed unit comprising a first accommodation chamber;
a movable unit received in the first accommodation chamber;
a supporting base mounted on the bottom portion of the fixed unit;
a spring plate comprising:
a plate body having a through hole defined at the center thereof, the plate body comprising an outer closed-loop frame, an inner closed-loop frame, and a plurality of spring parts interconnected between the outer closed-loop frame and the inner closed-loop frame, the outer closed-loop frame and the inner closed frame being respectively mounted on the fixed unit and the movable unit, and a terminal perpendicularly extending from the plate body, and having an end portion distal from the plate body, the end portion of the terminal defining at least one of a through hole and a recess therein, and
an electrically conductive adhesive, the end portion of the terminal being electrically connected to the supporting base with the electrically conductive adhesive.

2. The voice coil motor of claim 1, wherein the at least one through hole comprises a plurality of through holes.

3. The voice coil motor of claim 2, wherein the terminal is L-shaped, and comprises a first connection portion connected to the plate body, and a second connection portion perpendicular to the first connection portion, the second connection portion is distal from the plate body, and the through holes are defined in the second connection portion.

4. The voice coil motor of claim 1, wherein the at least one recess comprises a plurality of recesses.

5. The voice coil motor of claim 4, wherein the recesses are exposed at a common straight edge of the end portion.

6. The voice coil motor of claim 5, wherein the terminal is L-shaped, and comprises a first connection portion connected to the plate body, and a second connection portion perpendicular to the first connection portion, the second connection portion is distal from the plate body, and the recesses are defined in the second connection portion.

7. The voice coil motor of claim 2, wherein the fixed unit comprises a cubic bracket, the cubic bracket comprises a frame body, the first accommodation chamber is defined in the frame body, a terminal groove is formed on one side of the frame body, and the terminal is mounted in the terminal groove.

8. The voice coil motor of claim 7, wherein the supporting base is mounted on the bottom portion of the bracket, and comprises a supporting surface facing the bracket, an electrically conductive pad is formed on the supporting surface, and the end portion of the terminal is electrically connected to the electrically conductive pad with the electrically conductive adhesive.

9. The voice coil motor of claim 4, wherein the fixed unit comprises a cubic bracket, the cubic bracket comprises a frame body, the first accommodation chamber is defined in the frame body, a terminal groove is formed on one side of the frame body, and the terminal is mounted in the terminal groove.

10. The voice coil motor of claim 9, wherein the supporting base is mounted on the bottom portion of the bracket, and comprises a supporting surface facing the bracket, an electrically conductive pad is formed on the supporting surface, and the end portion of the terminal is electrically connected to the electrically conductive pad with the electrically conductive adhesive.

11. The voice coil motor of claim 5, wherein the recesses cooperatively define a square wave pattern or a saw tooth wave pattern.

\* \* \* \* \*